United States Patent [19]

Asanuma et al.

[11] Patent Number: 5,376,406
[45] Date of Patent: Dec. 27, 1994

[54] METHOD FOR PREPARING DECOMPOSABLE FILM AND ITS UTILIZATION

[75] Inventors: Tadashi Asanuma, Kanagawa; Kaoru Kawanishi, Osaka, both of Japan

[73] Assignee: Mitsui Toatsu Chemicals, Incorporated, Tokyo, Japan

[21] Appl. No.: 107,151

[22] Filed: Aug. 17, 1993

[30] Foreign Application Priority Data

| Aug. 21, 1992 | [JP] | Japan | 4-222878 |
| May 7, 1993 | [JP] | Japan | 5-106404 |
| Jul. 7, 1993 | [JP] | Japan | 5-167699 |
| Jul. 7, 1993 | [JP] | Japan | 5-167700 |
| Jul. 19, 1993 | [JP] | Japan | 5-177730 |
| Jul. 19, 1993 | [JP] | Japan | 5-177731 |

[51] Int. Cl.$^5$ ............................. B05D 3/02
[52] U.S. Cl. ...................... 427/226; 427/404; 427/407.1
[58] Field of Search ............. 427/404, 226, 385.5, 427/407.1

[56] References Cited

U.S. PATENT DOCUMENTS

| 3,625,733 | 12/1971 | Mansur | 427/226 |
| 3,661,615 | 5/1972 | Gray et al. | 427/226 |
| 3,779,807 | 12/1973 | Taylor et al. | 427/226 |
| 3,784,407 | 1/1974 | Shiio et al. | 427/226 |
| 4,284,662 | 8/1981 | Matsuzaki et al. | 427/226 |
| 4,539,222 | 9/1985 | Anderson, Jr. et al. | 427/226 |

FOREIGN PATENT DOCUMENTS

3028227 2/1991 Japan .

OTHER PUBLICATIONS

Jellinek et al; European Polymer Jnl.-Suppl. pp. 149–171, 1969. Abstract.
Pozdnyakov et al; Polymer Science USSR, v 20, n. 11, pp. 2799–2804, 1978. Abstract.

*Primary Examiner*—Michael Lusignan
*Assistant Examiner*—Erma Cameron
*Attorney, Agent, or Firm*—Burns, Doane, Swecker & Mathis

[57] ABSTRACT

A method for preparing a decomposable film which comprises the steps of dispersing poly-α-methylstyrene or a polyalkylene carbonate in water, or preferably dissolving poly-α-methylstyrene or the polyalkylene carbonate in a solvent, dispersing the resulting solution in water, vaporizing the solvent so that the content of the solvent may be in the range of from 20 to 100% by weight based on the weight of poly-α-methylstyrene or the polyalkylene carbonate, applying the resulting aqueous emulsion, and then drying the same; and a method for preparing a metal film having a flat surface which comprises the steps of depositing a metal on the surface of the decomposable film, and then treating the film at a temperature higher than the decomposition temperature of the film.

14 Claims, No Drawings

METHOD FOR PREPARING DECOMPOSABLE FILM AND ITS UTILIZATION

BACKGROUND OF THE INVENTION

1. Field of the Invention

The present invention relates to a method for preparing a decomposable film of a polymer, and a utilization of this decomposable film. More specifically, it relates to a method for preparing a decomposable film by applying an emulsion containing a specific polymer, and its utilization.

2. Description of the Prior Art

It has been widely carried out that for the purpose of temporarily smoothing a coarse surface or temporarily protecting a surface, the solution of a decomposable polymer is applied and then dried to form a coating film. In this case, the decomposable polymer, when used, is usually dissolved in an organic solvent, but in the case that the employment of the organic solvent is not desirable, an aqueous emulsion has instead been used. For this purpose, an aqueous emulsion which can be obtained by the emulsion polymerization of a methacrylate has been used.

The aqueous emulsion of a polymethacrylate is relatively excellent in thermal decomposition properties, but under oxygen-free or water-free conditions, it is very difficult to completely decompose and vaporize the aqueous emulsion of polymethacrylate, even when heating is carried out. Therefore, this conventional technique has a problem that a large amount of an undecomposed residue remains. In consequence, it is desired to develop an aqueous emulsion of a polymer having excellent decomposition properties.

OBJECTS AND SUMMARY OF THE INVENTION

The present inventors have conduct research regarding an aqueous emulsion of a polymer having more excellent decomposition properties for the purpose of solving the above-mentioned problems, and as a result, they have completed the present invention.

That is, one object of the present invention is to provide a method for preparing a decomposable film which comprises the steps of applying and then drying an aqueous emulsion in which a polymer of poly-α-methylstyrene or a polyalkylene carbonate is dispersed in water.

Another object of the present invention is to provide a utilization of the thus obtained decomposable film, and as this utilization, there is a method for preparing a metal film having a flat surface which comprises the steps of applying, onto a coarse surface, an aqueous emulsion obtained by dispersing poly-α-methylstyrene or a polyalkylene carbonate in water; drying the emulsion; depositing a metal on the surface of the formed poly-α-methylstyrene or polyalkylene carbonate layer; and then treating the layer at a temperature higher than a thermal decomposition temperature of the poly-α-methylstyrene or the polyalkylene carbonate.

In the method for preparing the decomposable film according to the present invention, the film can be easily prepared without the volatilization of an organic solvent, and therefore the present invention is industrially very valuable. Thus, for example, the present invention is useful to form a metal-deposited film having a smooth surface.

DETAILED DESCRIPTION OF THE INVENTION

In the present invention, as poly-α-methylstyrene, there can be used a polymer obtained by the anionic polymerization with α-methylstyrene. A copolymer of another styrene monomer can also be used, so long as it does not impair decomposition properties. For example, in the case that styrene is used, its content is preferably in the range of 50 mol % or less. The number average molecular weight of the polymer is preferably in the range of from about 5,000 to about 1,000,000. The particularly preferable polymer is poly-α-methylstyrene in which the number average molecular weight is 50,000 or less and the weight average molecular weight/number average molecular weight ratio is 3 or more, and when such a polymer is used, a film having good properties can be obtained. In addition to the above-mentioned anionic polymerization, poly-α-methylstyrene can also be prepared by the cationic polymerization of α-methylstyrene with a Lewis acid or the like without mixing a polymer which can meet the above-mentioned requirements. For example, if the cationic polymerization is carried out at a relatively high catalyst concentration and at a relatively high temperature, the desired product can be obtained. On the other hand, the polymer obtained by the usual anionic polymerization has a molecular weight distribution of at most 2, even when the polymerization is carried out at increased concentration of a catalyst, and so the thus obtained polymer cannot meet the above-mentioned requirements. Therefore, it is necessary that a part of the catalyst is inactivated during the polymerization so as to achieve the polymerization at a lower polymerization temperature, or that an oligomer obtained by the cationic polymerization is mixed with the polymer, whereby the molecular weight distribution can be spread and a desired glass transition temperature can be obtained. In particular, the polymer having glass transition temperature of 100° C. or less, especially 100°–0° C. can be preferably utilized.

With regard to the polyalkylene carbonate, one example can be obtained by copolymerizing an alkylene oxide having 2 to 10 carbon atoms and carbon dioxide in the presence of a catalyst, and the utilizable copolymer has a number average molecular weight of 1,000–1,000,000, usually 5,000–500,000 or so. Prior to utilization, the copolymer may be hydrolyzed with an alkali to lower its molecular weight. In addition, as the polyalkylene carbonate, there can also be used a polycarbonate obtained from a diol and 2,5-dialkyl-o-o'-bis(1-imidazoylcarbonyl)-2,5-hexanediol [Houlihan et al., Macromlecules, 19, p. 13 (1986)], and a polymer obtained by ring-opening-polymerization of a cyclic carbonate [Keul et al., Makromol. Chem., 187, p. 2579 (1986); and Storeg et al., Macromolecules, 25, p. 5369 (1992)].

In the present invention, the above-mentioned polymer is dissolved at a relatively high concentration in a solvent such as benzene, toluene, xylene, ethylbenzene, methylene chloride, chloroform or ethylene dichloride which is not compatible with water, and the resulting solution is then mixed with water containing a small amount of a surface active agent and a water-soluble polymer with relatively vigorous stirring, whereby emulsification is achieved. The thus obtained emulsion is heated under reduced pressure with stirring to remove the solvent therefrom, thereby preparing an aqueous emulsion. The removal of the solvent does not have to be completely carried out, and when a certain amount of the solvent remains, the obtained film can possess excellent characteristics. For such a purpose, the amount of the solvent is in the range of from 20 to 100% by weight based on the weight of the polymer. In this case, for the purpose of adjusting the viscosity of the polymer solution, a plasticizer is preferably used. As the plasticizer, a compound having a low melting point and a relatively high boiling point can be utilized, and examples of the utilizable plasticizer include esters of phthalic acids, esters of phosphoric acid and oligomers of α-methyl styrene. In such a case, it is not always necessary that the solvent remain in the aqueous emulsion since polymer will function as the solvent. Above all, When an ester of an aliphatic carboxylic acid is used, the viscosity of the emulsion is low, and even if the concentration of the polymer is increased, the fluidity of the emulsion can be kept up. In consequence, the formation of the film can be achieved by the use of the concentrated emulsion, and eventually the good film can be prepared. Typical examples of the ester of the aliphatic carboxylic acid include esters of divalent carboxylic acids such as adipic acid, azelaic acid and sebacic acid as well as esters of monovalent carboxylic acids such as oleic acids. For the formation of these esters, alcohols having 3 or more carbon atoms are preferably used. Additionally, in order to stabilize the aqueous emulsion, it is possible to use sodium hydroxide, potassium hydroxide, calcium hydroxide, sodium phosphate, sodium dihydrogenphosphate, potassium phosphate and potassium dihydrogenphosphate.

The emulsification can also be achieved by another process, i.e., by first dissolving the above-mentioned polymer at a relatively high concentration in a solvent to be mixed with water, and then mixing the solution with water containing a small amount of a nonionic or an anionic surface active agent and a water-soluble polymer with vigorous stirring. In this case, it is preferable to considerably increase the concentration of the polymer. Also in this case, if necessary, the excessive solvent can be removed by heating under reduced pressure with stirring, after the emulsification.

For the purpose of forming the uniform film having good characteristics from the emulsion, an antifoaming agent can be used. No particular restriction is put on the kind of antifoaming agent which can be used for this purpose, and various kinds of commercial silicon-based anti-foaming agents can be utilized. The amount of the anti-foaming agent to be used is in the range of from 1/100,000 to 1/1,000 of the emulsion.

As the antifoaming agent, various kinds of products are commercially available and utilizable. In particular, the silicon-based antifoaming agents are effectively and easily used.

Here, the concentration of the polymer in the emulsion is usually 5% by weight or more, preferably in the range of from 10 to 30% by weight. As the surface active agents, the nonionic, anionic and cationic products are mainly on the market and any type of these surface active agents is usable, but the anionic and nonionic surface active agents can be particularly preferably utilized. Examples of the surface active agent include carboxylates, sulfonates, sulfates, phosphates, quaternary ammonium salts, ethers, ether esters, esters and fatty amides. Typical examples of these surface active agents include sodium alkylbenzenesulfonates, sodium alkylsulfonates, polyethylene oxide alkyl ethers, polyethylene oxide alkylphenyl ethers, polyethylene oxide alkyl ether sulfonates and polyethylene oxide alkyl ether phosphates.

Examples of the water-soluble polymer which can be used in order to stabilize the emulsion include polyvinyl alcohol, polyacrylic acid, polymethacrylic acid, poly-N-methylpyrrolidone and polypyridine.

In the present invention, the thus obtained emulsion is applied and then dried to form the decomposable film, but the drying is carried out at a temperature not more than the decomposition temperature of the polymer, i.e., usually in the range of from 50° to 200° C.

The thus obtained film can be heated at a temperature in the range of from 250° to 500° C., whereby the film can be completely vaporized. Thus, the film can be removed at a relatively low temperature, and therefore, for example, there is no problem that a substrate onto which the film is applied deteriorates.

As a practical use, the decomposable film can be applied to a case where a flat metal film is formed on a rough surface. In the concrete, a metal film can be formed on the decomposable film by vapor deposition and then heated to vaporize/remove the decomposable film, whereby the flat metal film can be formed on the rough surface.

That is, the emulsion obtained in the above-mentioned manner can be applied onto the coarse surface on which the flat metal film is to be formed, and then dried to smooth the surface. Next, the metal is deposited on the smooth surface, and then heated at a temperature higher than the decomposition temperature of the polymer, whereby a metal film having a flat surface can be formed. No particular restriction is put on the kind of metal which can be used herein, so long as it can be deposited, but examples of metals which can be used include gold, silver, aluminum, nickel and copper. The above-mentioned drying is carried out at a temperature lower than the decomposition temperature of the polymer, usually at a temperature of from 50° to 200° C.; the deposition of the metal is carried out similarly at a temperature lower than the decomposition temperature of the polymer, usually at a temperature of from 50° to 100° C.; and the decomposition of the polymer is carried out at a temperature of from 200° to 500° C. Hence, the film can be removed at a low temperature, and therefore there are not problems such as deterioration and deformation of the metal.

Now, the present invention will be described in detail in reference to examples. The scope of the present invention should not be limited to these examples.

Example 1

In 20 ml of benzene were dissolved 8 g of a trimer of α-methylstyrene and 12 g of poly-α-methylstyrene having a number average molecular weight of 120,000 obtained by polymerizing α-methylstyrene in the presence of butyl lithium, and the solution was then added to an aqueous solution obtained by dissolving 1 g of sodium dodecylbenzenesulfonate in 100 ml of water. Next, they were sufficiently mixed by a homogenizer, and 18 ml of benzene were then distilled off with stirring under a reduced pressure of 100 mmHg. The thus obtained emulsion was applied onto a glass plate and then dried to form a film having a thickness of 3 μm. Afterward, the film was treated at 380° C. for 1 hour, and as a result, the film was completely vaporized.

Comparative Example 1

The same procedure as in Example 1 was carried out except that an emulsion obtained by emulsion polymerization of methyl methacrylate in the presence of potassium persulfate (a surface active agent and a solid concentration were same as in Example 1), and in this case, a carbonized residue was observed on the surface of the glass.

Example 2

The same procedure as in Example 1 was carried out except that 20 g of an oligomer (number average molecular weight=about 4,500) were used which was obtained by hydrolyzing, with an aqueous sodium hydroxide solution, polypropylene carbonate (number average molecular weight=about 80,000) formed by polymerizing propylene oxide and carbon dioxide. In this case, a residue was not observed at all.

Example 3

The same procedure as in Example 1 was carried out except that sodium dodecylbenzenesulfonate was replaced with polyethylene glycol nonylphenyl ether, so that a film having a thickness of 4 μm was formed. Next, the film was treated at 380° C. for 1 hour, and as a result, the film was completely vaporized.

Example 4

In 20 g of toluene were dissolved 8 g of a trimer of α-methylstyrene and 12 g of poly-α-methylstyrene having a number average molecular weight of 120,000 obtained by polymerizing α-methylstyrene in the presence of butyl lithium, and the solution was then added to an aqueous solution obtained by dissolving 1 g of sodium dodecylbenzenesulfonate in 100 ml of water. Next, they were sufficiently mixed by a homogenizer, and 15 g of toluene were distilled off with stirring under a reduced pressure of 100 mmHg. The thus obtained emulsion was applied onto a glass plate and then dried to form a film having a thickness of 3 μm. The thus formed film has a flat surface, and this film was then treated at 380° C. for 1 hour, and as a result, the film was completely vaporized. On the contrary, when 19 g of toluene were removed, an obtained film was not completely flat, and a roughness of about 0.3 μm was observed.

Example 5

The same procedure as in Example 4 was carried out except that 20 g of an oligomer (number average molecular weight=about 4,500) were used which was obtained by hydrolyzing, with an aqueous sodium hydroxide solution, polypropylene carbonate (number average molecular weight=about 80,000) formed by polymerizing propylene oxide and carbon dioxide, that 30 g of methyl ethyl ketone were used as a solvent, and that 20 g of methyl ethyl ketone were removed. In this case, the surface of an obtained film was flat, and a residue was not observed at all.

Example 6

In 20 g of toluene were dissolved 8 g of diisobutyl adipate and 12 g of poly-α-methylstyrene having a number average molecular weight of 12,000 and a weight average molecular weight/number average molecular weight ratio of 6.5 obtained by polymerizing α-methylstyrene in the presence of sulfuric acid, and the solution was then added to an aqueous solution obtained by dissolving 1 g of sodium dodecylbenzenesulfonate in 100 ml of water. Next, they were sufficiently mixed by a homogenizer, and 15 g of toluene were then distilled off by heating the solution with stirring at 40° C. under a reduced pressure of 100 mmHg. In the thus obtained emulsion, a solids concentration (the ratio of poly-α-methylstyrene and diisobutyl adipate to the total) was 35%. Afterward, the emulsion was subjected to spin-coating at 100 rpm, and then dried at 80° C. to obtain a uniform transparent film having a thickness of 8 μm. Next, the film was treated at 380° C. for 1 hour, and as a result, the film was completely vaporized.

Example 7

The same procedure as in Example 6 was carried out except that there was used poly-α-methylstyrene having a number average molecular weight of 120,000 and a weight average molecular weight/number average molecular weight ratio of 1.8 obtained by anionic polymerization. When a solid concentration was 35%, a thick film having a thickness of 65 μm was only obtained even by setting the rotational speed of spin coating to 400 rpm. Furthermore, when the solid concentration was diluted to 15% and coating was then carried out, a film having an average thickness of 8 μm could be obtained but it was whitened. Next, the film was treated at 380° C. for 1 hour, and as a result, the film was completely vaporized.

Example 8

The same procedure as in Example 6 was carried out except that diisobutyl adipate was replaced with dioctyl phthalate, to obtain an emulsion having a solid concentration of 35%. By the use of this emulsion, a transparent film having a thickness of 10 μm was obtained. Next, the film was treated at 380° C. for 1 hour, and as a result, the film was completely vaporized.

Example 9

The same procedure as in Example 6 was carried out except that poly-α-methylstyrene having a number average molecular weight of 12,000 and a weight average molecular weight/number average molecular weight ratio of 1.6 obtained by anionic polymerization was used. In this case, a whitened film having a thickness of 9 μm was obtained. Next, the film was treated at 380° C. for 1 hour, and as a result, the film was completely vaporized.

Example 10

In 20 g of toluene were dissolved 8 g of diisooctyl adipate and 12 g of poly-α-methylstyrene having a number average molecular weight of 120,000 obtained by polymerizing α-methylstyrene in the presence of butyl lithium, and the solution was then added to an aqueous solution obtained by dissolving 1 g of sodium dodecylbenzenesulfonate in 100 ml of water. Next, they were sufficiently mixed by a homogenizer, and 15 g of toluene were distilled off by heating the solution at 40° C. with stirring under a reduced pressure of 100 mmHg. In the thus obtained emulsion, a solid concentration (a ratio of poly-α-methylstyrene and diisobutyl adipate to the total) was 35%. Afterward, the emulsion was subjected to spin-coating at 300 rpm, and then dried at 80° C. to obtain a uniform film having a thickness of 12 μm. Next, the coating film was treated at 380° C. for 1 hour, and as a result, the film was completely vaporized.

Example 11

The same procedure as in Example 10 was carried out except that 1 g of sodium dodecylbenzenesulfonate was replaced with 0.5 g of polyethylene glycol nonylphenyl ether and polyvinyl alcohol (saponification ratio=85%, polymerization degree=2,000), to obtain a film having a thickness of 13 μm. Next, the film was treated at 380° C. for 1 hour, and as a result, the film was completely vaporized.

Example 12

The same procedure as in Example 10 was carried out except that diisooctyl adipate was replaced with diisobutyl phthalate. When a solid concentration was 35%, a thick film having a thickness of 65 μm was only obtained, and furthermore, when the solid concentration was diluted to 20% and coating was then carried out, a film having an average thickness of 15 μm could be obtained but it was slightly nonuniform. Next, the film was treated at 380° C. for 1 hour, and as a result, the film was completely vaporized.

Example 13

The same procedure as in Example 10 was carried out except that diisooctyl adipate was replaced with dioctyl phthalate. When a solid concentration was 35%, a thick film having a thickness of 70 μm was only obtained, and furthermore when the solid concentration was diluted to 15% and coating was then carried out, a film having an average thickness of 13 μm could be obtained but it was slightly nonuniform. Next, the film was treated at 380° C. for 1 hour, and as a result, the film was completely vaporized.

Example 14

The same procedure as in Example 10 was carried out except that poly-α-methylstyrene was replaced with 20 g of polypropylene carbonate (number average molecular weight=80,000) obtained by polymerizing propylene oxide and carbon dioxide, that ethyl acetate was used as a solvent, and that 2-ethylhexyl adipate was used as a plasticizer, to obtain an emulsion having a solid concentration of 38%. By the use of this emulsion, a uniform film having a thickness of 8 μm was obtained. Next, the coating film was treated at 380° C. for 1 hour, and as a result, the film was completely vaporized.

Example 15

The same procedure as in Example 2 was carried out except that 2-ethylhexyl adipate was replaced with dioctyl phthalate. When a solid concentration was 38%, a thick film having a thickness of 45 μm was only obtained, and furthermore when the solid concentration was diluted to 16% and coating was then carried out, a film having an average thickness of 10 μm could be obtained but it was nonuniform. Next, the coating film was treated at 380° C. for 1 hour, and as a result, the film was completely vaporized.

Example 16

In 20 g of toluene were dissolved 20 g of commercial poly-α-methylstyrene having a glass transition temperature of 45° C. (trade name Resin 18 #210, made by Amoco Chemicals Co., Ltd.), and the solution was then added to an aqueous solution obtained by dissolving 1 g of sodium dodecylbenzenesulfonate in 100 ml of water. Next, they were sufficiently mixed by a homogenizer, and 19 g of toluene were distilled off by heating the solution at 40° C. with stirring under a reduced pressure of 100 mmHg. In the thus obtained emulsion, a solid concentration was 40%. Afterward, the emulsion was subjected to spin-coating at 100 rpm, and then dried at 80° C. to obtain a uniform homogeneous film having a thickness of 8 μm. Next, the coating film was treated at 380° C. for 1 hour, and as a result, the film was completely vaporized.

Example 17

The same procedure as in Example 1 was carried out except that 1 g of sodium dodecylbenzenesulfonate was replaced with 0.5 g of polyethylene glycol nonylphenyl ether and polyvinyl alcohol (saponification ratio=85%, polymerization degree=2,000), to obtain a film having a thickness of 10 μm. Next, the coating film was treated at 380° C. for 1 hour, and as a result, the film was completely vaporized.

Example 18

The same procedure as in Example 16 was carried out except that poly-α-methylstyrene having a number average molecular weight of 120,000 and a weight average molecular weight/number average molecular weight ratio of 1.8 (glass transition temperature=168° C.) obtained by anionic polymerization was used in an amount of 20 g. In this case, a whitened film having a thickness of 7 μm was obtained. Next, the film was treated at 380° C. for 1 hour, and as a result, the film was completely vaporized.

Example 19

To 10 g of poly-α-methylstyrene in Example 18 were added 10 g of an oligomer of α-methylstyrene (an α-methylstyrene oligomer having an average molecular weight of 450 obtained by polymerizing α-methylstyrene in the presence of ethyldichloroaluminum) to form poly-α-methylstyrene having a glass transition temperature of 65° C., and an emulsion was then prepared in the same manner as in Example 16. By the use of this emulsion, a uniform film having a thickness of 12 μm was obtained. Next, the coating film was treated at 380° C. for 1 hour, and as a result, the film was completely vaporized.

Example 20

The same procedure as in Example 19 was carried out except that 12 g of poly-α-methylstyrene in Example 16 and 8 g of dioctyl phthalate were used together (glass transition temperature=48° C.), so that a transparent film having a thickness of 25 μm was obtained but it had spots scatteringly and was slightly nonuniform. Next, the coating film was treated at 380° C. for 1 hour, and as a result, the film was completely vaporized.

Example 21

In 20 ml of benzene were dissolved 8 g of a trimer of α-methylstyrene and 12 g of poly-α-methylstyrene having a number average molecular weight of 120,000 obtained by polymerizing α-methylstyrene in the presence of butyl lithium, and the solution was then added to an aqueous solution obtained by dissolving 1 g of sodium dodecylbenzenesulfonate in 100 ml of water. Next, they were sufficiently mixed by a homogenizer, and 18 ml of benzene were distilled off by heating the solution at 40° C. with stirring under a reduced pressure of 100 mmHg. An anti-foaming agent (trade name SH5503, made by Toray Dow Corning Silicon Co., Ltd.) was added to the thus obtained emulsion in a weight ratio of 1/100,000, and the emulsion was then applied onto a glass plate and then dried to form a uniform film having a thickness of 3 μm. Next, this film was treated at 380° C. for 1 hour, and as a result, the film was completely vaporized.

On the contrary, the same procedure as described above was repeated except that any antifoaming agent was not used, and in this case, cissings were observed on some parts of the glass surface and the film was nonuniform. However, when the film was treated at 380° C. for 1 hour, the film was completely vaporized.

Example 22

The same procedure as in Example 21 was carried out except that poly-α-methylstyrene was replaced with 20 g of an oligomer (molecular weight=about 4,500) obtained by hydrolyzing, with an aqueous sodium hydroxide solution, polypropylene carbonate (number average molecular weight=80,000) obtained by polymerizing propylene oxide and carbon dioxide and that a trimer of α-methylstyrene was not used. As an antifoaming agent, however, there was used a block copolymer of methyl silicone and polyoxyethylene (trade name KF351, made by Shin-Etsu Chemical Co., Ltd.). In this case, a uniform film was formed, and similarly any residue was not observed.

Example 23

In 20 ml of benzene were dissolved 8 g of a trimer of α-methylstyrene and 12 g of poly-α-methylstyrene having a number average molecular weight of 120,000 obtained by polymerizing α-methylstyrene in the presence of butyl lithium, and the solution was then added to an aqueous solution obtained by dissolving 1 g of sodium dodecylbenzenesulfonate in 100 ml of water. Next, they were sufficiently mixed by a homogenizer, and 18 ml of benzene were distilled off by heating the solution at 40° C. with stirring under a reduced pressure of 100 mmHg. The thus obtained emulsion was then applied onto a ground glass plate and then dried at 80° C. to form a film having a thickness of 30 μm. Afterward, the glass having the poly-αmethylstyrene film formed thereon was put into a metallizing apparatus, and aluminum was then deposited as thick as 10 μm on the film under $10^{-5}$ mmHg. Furthermore, the glass was directly heated up to 380° C. over 30 minutes, while this reduced pressure was maintained, and as a result, a flat aluminum film was formed.

Comparative Example 2

Aluminum was deposited without applying any emulsion, and as a result, an aluminum film having no metallic luster was formed.

Example 24

The same procedure as in Example 23 was carried out except that poly-α-methylstyrene was replaced with 20 g of an oligomer (molecular weight=about 4,500) obtained by hydrolyzing, with an aqueous sodium hydroxide solution, polypropylene carbonate (number average molecular weight=80,000) obtained by polymerizing propylene oxide and carbon dioxide and that a trimer of α-methylstyrene was not used. In this case, an aluminum film having a flat surface was similarly formed.

What is claimed is:

1. A method for preparing a decomposable film which comprises the steps of applying to a surface an aqueous emulsion obtained by dispersing poly-α-methylstyrene having a number average molecular weight in the range of from 5,000 to 1,000,000 or a polyalkylene carbonate having a number average molecular weight in the range of from 1,000 to 1,000,000 in water, and then drying the emulsion.

2. The method according to claim 1 wherein the aqueous emulsion is obtained by dispersing, in water, a solution formed by dissolving poly-α-methylstyrene or a polyalkylene carbonate in a solvent, and then removing solvent so that the content of the solvent is in the range of from 20 to 100% by weight based on the weight of poly-α-methylstyrene or the polyalkylene carbonate.

3. The method according to claim 1 wherein the concentration of poly-α-methylstyrene or the polyalkylene carbonate in the emulsion is in the range of from 10 to 30% by weight.

4. The method according to claim 1 wherein poly-α-methylstyrene or the polyalkylene carbonate is dispersed in water in the presence of a surface active agent and an antifoaming agent.

5. The method according to claim 4 wherein the amount of the antifoaming agent to be used is in the range of from 1/100,000 to 1/1,000 of the emulsion in terms of weight.

6. The method according to claim 1 wherein poly-α-methylstyrene or the polyalkylene carbonate is dispersed in water in the presence of a plasticizer.

7. The method according to claim 1 wherein in dispersing poly-α-methylstyrene or the polyalkylene carbonate in water, an ester of an aliphatic carboxylic acid is used as a plasticizer.

8. The method according to claim 1 wherein the aqueous emulsion has dispersed therein poly-α-methylstyrene having a glass transition temperature in the range of from 100° to 0° C.

9. The method according to claim 1 wherein the aqueous emulsion is obtained by dispersing, in water, a plasticizer and poly-α-methylstyrene having a number average molecular weight of 50,000 or less and a weight average molecular weight/number average molecular weight ratio of 3 or more.

10. The method according to claim 1 wherein the aqueous emulsion has dispersed therein polyalkylene carbonate obtained by copolymerizing an alkylene oxide having 2 to 10 carbon atoms and carbon dioxide.

11. A method for preparing a metal film having a flat surface which comprises the steps of applying, onto a coarse surface, an aqueous emulsion obtained by dispersing poly-α-methylstyrene having a number average molecular weight in the range of from 5,000 to 1,000,000 or a polyalkylene carbonate having a number average molecular weight in the range of from 1,000 to 1,000,000 in water; drying the emulsion; depositing a metal on the surface of the formed poly-α-methylstyrene or polyalkylene carbonate layer; and then heating the layer at a temperature higher than a thermal decomposition temperature of poly-α-methylstyrene or the polyalkylene carbonate.

12. The method for preparing a decomposable film according to claim 1 which comprises the steps of applying to a surface an aqueous emulsion having a concentration of poly-α-methylstyrene or polyalkylene carbonate in the range of from 10 to 30% by weight based on the emulsion and dispersed in water in the presence of a surface active agent and an antifoaming agent, and then drying the emulsion.

13. The method according to claim 12 wherein the polyalkylene carbonate is obtained by copolymerizing an alkylene oxide having 2 to 10 carbon atoms and carbon dioxide.

14. The method according to claim 2 wherein the solvent is removed by vaporization.

* * * * *